June 19, 1923.

C. A. LAISE ET AL
ELECTRIC HEATING UNIT
Filed April 8, 1922

1,459,307

WITNESS

INVENTORS
Clemens A. Laise
Albert J. Gallager
ATTORNEY

Patented June 19, 1923.

1,459,307

UNITED STATES PATENT OFFICE.

CLEMENS A. LAISE, OF WEEHAWKEN, AND ALBERT J. GALLAGER, OF WEST ORANGE, NEW JERSEY.

ELECTRIC HEATING UNIT.

Application filed April 8, 1922. Serial No. 550,579.

*To all whom it may concern:*

Be it known that we, CLEMENS A. LAISE and ALBERT J. GALLAGER, citizens of the United States, and residents, respectively, of Weehawken, Hudson County, State of New Jersey, and West Orange, county of Essex, and State of New Jersey, have jointly invented certain new and useful Improvements in Electric Heating Units, of which the following is a specification.

This invention relates to electric heating devices, particularly those adapted to be immersed in liquids and solutions for the purpose of heating the same.

Heaters of this sort have a tendency to gradually deteriorate and burn out through oxidation of the resistance wire or element by the atmospheric oxygen enclosed in its protecting covering or casing in contact therewith at the high temperatures attained by these wires. When this occurs, the heater may be restored by removing the heating element from its enclosing casing or shell and replacing it with a new element. As heretofore constructed the removal and replacement of the heating or resistance wire could not be accomplished without tools suited for the purpose and the return of the heater to the factory and the services of a mechanic were required.

An object of the present invention is to provide a heater of this type in which the heating element is protected from oxidation.

Another object of the invention is to provide a heater of the above type in which the heating element is protected from oxidation by the provision of an inert atmosphere in contact with the heating or resisting element.

Another object of the invention is to provide a heater of the above type in which the heating element may be readily removed from its enclosing shell or casing without the necessity of using tools for this purpose.

A still further object of the invention is to provide a method of protecting heating elements from oxidation.

With these and other objects the invention comprises the method and heater described in the following specification and claims.

The various features of the invention are illustrated in the accompanying drawings in which.

Figure 1:
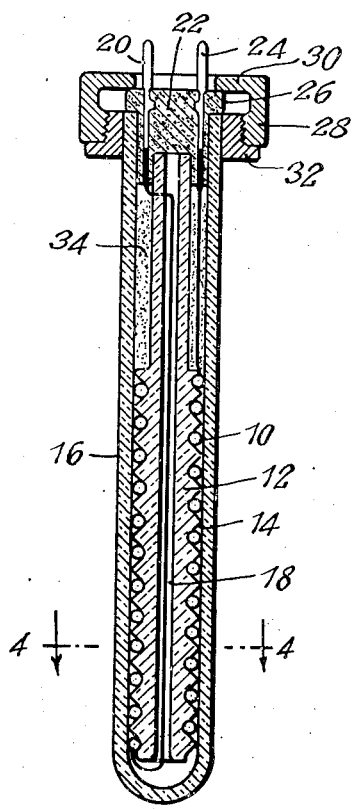
Fig. 1 is a longitudinal sectional view of a heater embodying a preferred form of the invention.

In the present invention the heating or resistance element is contained in a shell or casing which is filled with an inert or non-oxidizing atmosphere. This atmosphere is formed by displacing the air in the shell with nitrogen, carbon dioxide, hydrogen, argon or a mixture of similar inert gases, or by enclosing in the casing or shell some easily oxidized substance such as finely divided metallic powders, suboxides or other reducing substances capable of absorbing and uniting with the oxygen of the atmosphere and preventing it from attacking the resistance element, or with some carbonate nitride or other material which decomposes at the temperatures to which the device is heated. Or two or more of these methods may also be combined. The heating or resistance core and wire are formed in a single unitary structure which may be inserted into or removed from its enclosing shell or casing as a unit. The element is so formed that it is held in position in the shell by means of a clamping or flanged collar or cap mounted on the open end of the shell by screwthreads or other suitable means to permit the heating element to be easily mounted or replaced.

Referring more particularly to the accompanying drawings, a resistance wire 10 is mounted on a core 12 of suitable heat resisting, insulating material having grooves 14 in which coils of the wire are mounted and is enclosed in a shell or casing 16 of fused silica or similar material. The shell 16 and the core 12 are so proportioned that the wire 10 is very close to or in contact with the wall of the shell to provide a very effective heat transfer from the wire to the liquid in which the heater is immersed.

One end of the wire passes from the lower end of the core upwardly through a passage 18 to a terminal 20 mounted on a stopper 22 on which the core 12 is mounted and the other end of the wire passes over the outer face of the core to a terminal 24 on the stopper 22. The core, stopper and wire form a compact unitary structure which may be inserted into and removed from the shell 14 as a unit. The stopper 22 is provided with an outwardly extending flange 26 which is engaged and held between the upper edge or mouth of the shell and a threaded cap 28 having an inwardly extending flange 30 engaging the flange 26 and holding the stopper in a rigid position in the shell and closing the interior of the shell from the atmosphere. The cap 28 is mounted on the shell by means of a collar 32 of bakelite, condensite or similar non-corrosive material fitted on the shell 14 and provided with outward screw threads on which the cap may be readily screwed or unscrewed to permit the core or the heating cartridge to be readily removed without the necessity of using tools. A collar of insulating material 34 such a magnesia or asbestos is mounted on the upper part of the core 12.

In assembling the heater the air within the shell is displaced with an inert or non-oxidizing gas such as nitrogen, argon or hydrogen or a mixture of such gases and this gas mixture is retained in the shell when the heater is used and prevents or lessens the oxidation of the resistance wire.

Figure 3:
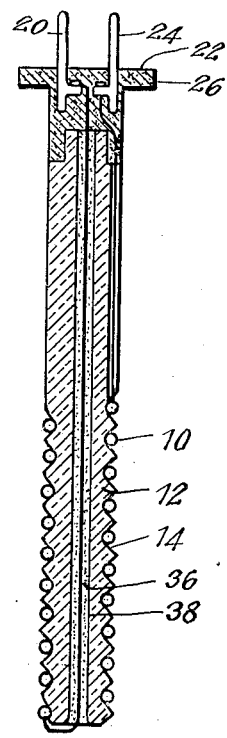
Figure 4:
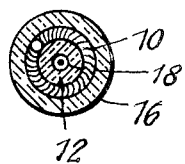
Fig. 4 is a section on line 4—4 of Fig. 1.
Figure 5:
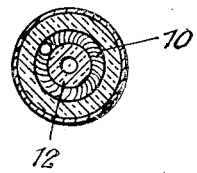
Fig. 5 is a section on line 5—5 of Fig. 2.

An inert or non-oxidizing atmosphere may also be formed by coating the coil or wire 10 with a readily oxidizable powder of metal or suboxide and in this case the air in the shell 14 need not be displaced as the oxygen will combine with the oxidizable powder and leave only nitrogen and other inert gases of the atmosphere in contact with the resistance wire. An inert atmosphere may also be formed, as indicated in Fig. 3, by placing a quantity of material 36, which gives an inert gas on heating, such as a readily decomposable carbonate or suitable nitrogen compound in a cavity 38 in the core 12. As the heater becomes hot the material gives off nitrogen or carbon dioxide or other inert material to displace the air and produces an inert atmosphere. This method of forming the inert atmosphere is very convenient and useful when a burned out resistance wire is being replaced as it enables cores to be inserted which will generate an inert atmosphere and therefore may be sold separate from the casing for this purpose.

Figure 2:
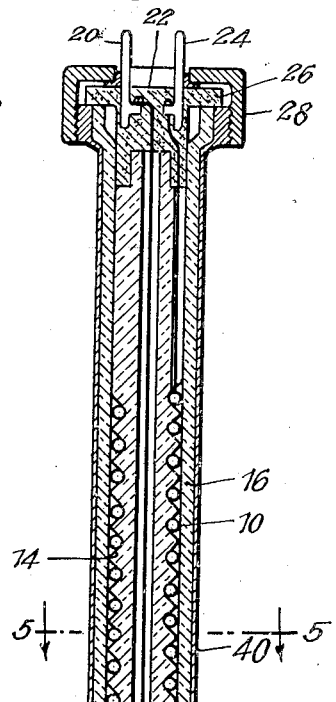
Fig. 2 is a longitudinal sectional view of a heater embodying a modified form of the invention, and, Fig. 3 is a longitudinal sectional view of a form of heating or resistance element adapted to be used in the heaters shown in Figs. 2.

Instead of a shell or casing of fused silica a casing preferably of non-corrosive metal 40 lined with molded magnesia, asbestos or other similar material may be used as illustrated in Fig. 2, the lining serving to protect the metal part of the casing from contact with the resistance wire. The metallic casing may be made of aluminum, Tobin bronze, monel or other suitable metal which is not attacked or corroded by the liquids which may be heated by the heater. The protective lining may in some cases be perforated to facilitate the transfer of heat. When a construction of this character is used the collar 32 and cap 28 may be made of bakelite or similar material.

Through the above invention the life of the resistance wire is greatly lengthened and when the wire burns out or is otherwise injured it may be easily and quickly replaced without the use of special tools or skill.

Having thus described our invention what we claim as new and desire to secure by Letters Patent is:

1. A heater of the kind described having a casing of insulating material, a core having a resistance wire mounted thereon and positioned in said casing, said casing also provided with an inert atmosphere therein.

2. A heater of the kind described which comprises a casing of insulating material, a core mounted in said casing and carrying a resistance wire and an inert gas developing means.

3. A heater of the kind described which comprises a tubular casing closed at one end and having a threaded open end, a cap adapted to screw onto said open end, a core having a portion adapted to be clamped to said tube by said cap and a resistance wire and terminals mounted on said core, and an inert atmosphere in said casing.

4. A heater of the kind described which comprises a tubular casing closed at one end and having a threaded open end, a cap adapted to screw onto said open end, a core having a portion adapted to be clamped to said open end of said tube by said cap, a resistance wire and an inert gas developing means mounted on said core.

5. A heater of the kind described which comprises a casing, a resistance wire in said casing and means in said casing for protecting said wire from oxidizing gases in the atmosphere in said casing.

6. A heating element for heaters of the kind described which comprises a core adapted to be inserted in a heater, a resistance wire on said core and a substance on said element for protecting said wire from oxidation when heated.

7. A heating element for heaters of the kind described which comprises a core adapted to be inserted into a heater, a resistance wire on said core and a substance in said element adapted to generate inert or non-oxidizing gases when heated.

8. In a device of the kind described, a unitary structure consisting of a supporting core provided with a stopper portion, a resistance wire and terminals mounted thereon, the said core, wire and terminals being adapted to be removably mounted as a unitary structure in a casing.

9. A replaceable unit for heaters of the kind described, said unit comprising a stopper adapted to fit a casing, terminal connections secured in said stopper, a core secured to said stopper, and a heating element supported on said core and connected in circuit to said terminal connections.

10. A replaceable unit for heaters of the kind described, said unit comprising a stopper adapted to fit a casing, terminal connections secured in said stopper, a core secured to said stopper provided with a cavity therein, a filling in said cavity of inert gas developing material, a heating element supported on said core and passing through said cavity and connected in circuit with said terminal connections.

11. A replaceable unit for heaters of the kind described, said unit comprising a stopper adapted to fit a casing, terminal connections secured in said stopper, a core secured to said stopper, said core being provided with a cavity therein, a heating element supported on said core passing through said cavity and connected in circuit with said terminal connections, said heating element carrying an inert gas developing means.

In witness whereof, we have hereunto set our hands at the borough of Manhattan, city, county and State of New York, this 7th day of April, 1922.

CLEMENS A. LAISE.
ALBERT J. GALLAGER.